United States Patent
Zhao et al.

(10) Patent No.: US 9,591,678 B2
(45) Date of Patent: Mar. 7, 2017

(54) CALL PROCESSING METHOD AND ACCESS NETWORK ELEMENT IN MOBILE COMMUNICATIONS SYSTEM

(71) Applicant: Huawei Technologies Co., Ltd., Shenzhen (CN)

(72) Inventors: Yuezheng Zhao, Xi'an (CN); Fei Du, Warsaw (PL); Qiwen Li, Xi'an (CN); Anquan Zhou, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 258 days.

(21) Appl. No.: 14/623,298

(22) Filed: Feb. 16, 2015

(65) Prior Publication Data

US 2015/0163839 A1    Jun. 11, 2015

Related U.S. Application Data

(63) Continuation of application No. PCT/CN2013/082188, filed on Aug. 23, 2013.

(30) Foreign Application Priority Data

Aug. 23, 2012 (CN) .......................... 2012 1 0302865

(51) Int. Cl.
*H04W 76/02* (2009.01)
*H04W 92/12* (2009.01)
(Continued)

(52) U.S. Cl.
CPC ....... *H04W 76/021* (2013.01); *H04L 67/1074* (2013.01); *H04W 28/0289* (2013.01); *H04W 92/12* (2013.01)

(58) Field of Classification Search
None
See application file for complete search history.

(56) References Cited

U.S. PATENT DOCUMENTS

| 2003/0134640 | A1* | 7/2003 | Kim ..................... H04W 76/002 455/438 |
| 2006/0111124 | A1* | 5/2006 | Kennedy ............... H04W 64/00 455/456.1 |

(Continued)

FOREIGN PATENT DOCUMENTS

| CN | 1452338 A | 10/2003 |
| CN | 101404829 A | 4/2009 |

(Continued)

OTHER PUBLICATIONS

"3rd Generation Partnership Project; Technical Specification Group GSM/EDGE Radio Access Network; Base Station Controller—Base Transceiver Station (BSC—BTS) Interface; Layer 3 Specification (Release 4)," 3GPP TS 48.058 V4.1.0, Feb. 2002, 81 pages.

(Continued)

*Primary Examiner* — Christine Duong
(74) *Attorney, Agent, or Firm* — Slater Matsil, LLP

(57) ABSTRACT

The present invention relates to a call processing method and an access network element in a mobile communications system. In a signaling exchange process for setting up a call leg, a call leg identifier that identifies a logical resource allocated by an access network element to the call leg is carried, thereby reducing signaling exchange caused by setup or release of a service link between access network elements in the prior art, saving signaling overhead in a call process, and enhancing call access capabilities of a mobile communications system effectively. In addition, after the service link between the access network elements is set up, service packets can be forwarded between the access network elements in a self-addressing manner.

20 Claims, 9 Drawing Sheets

(51) Int. Cl.
*H04L 29/08* (2006.01)
*H04W 28/02* (2009.01)

(56) References Cited

U.S. PATENT DOCUMENTS

2006/0159018 A1    7/2006   Park
2012/0076035 A1    3/2012   Zhou et al.

FOREIGN PATENT DOCUMENTS

CN      101437267 A    5/2009
CN      102149151 A    8/2011

OTHER PUBLICATIONS

"Interoperability Specification (IOS) for cdma2000 Access Network Interfaces—Part 5 (A3 and A7 Interfaces)," 3rd Generation Partnership Project 2 "3GPP2," 3GPP2 A.S0015-D, Version 1.0., Jun. 2007, 252 pages.

\* cited by examiner

CALL PROCESSING METHOD AND ACCESS NETWORK ELEMENT IN MOBILE COMMUNICATIONS SYSTEM

This application claims the benefit of International Application No. PCT/CN2013/082188, filed on Aug. 23, 2013, which claims priority to Chinese Patent Application No. 201210302865.4, filed on Aug. 23, 2012 which applications are hereby incorporated by reference.

TECHNICAL FIELD

The present invention relates to the field of a mobile communications technology, and in particular, to a call processing method and an access network element in a mobile communications system.

BACKGROUND

By virtue of rich and colorful applications, large-screen and high-performance smart terminals attract more and more users to join ranks of mobile broadband (Mobile Broadband, MBB) users, and bring huge profits to operators, but also cause the operators to encounter unprecedented signaling storms. The signaling storms further lead to frequent overloading of a signaling board in a network device. For example, a large quantity of radio connection setup and signaling release generated by fast dormancy (Fast Dormancy) often causes a control plane to be overloaded first while a service plane still runs normally. Therefore, it is necessary to reduce control plane signaling overhead, reduce signaling exchange in a call process to prevent overloading of the control plane in advance, and therefore enhance network access call capabilities and capabilities of coping with signaling storms.

A mobile communications system, such as a code division multiple access (CDMA) system, is responsible for accessing and processing data services such as voice, short message, and multimedia services of terminal users according to a protocol followed by the system, such as Abis, 3GPP2 IOS A1/A7 interface protocol, and the like. Such personal service data is generally processed within a signaling plane and a service plane only. To implement end-to-end service link setup, signaling exchange of interfaces such as Abis, A1, and A7 must be performed to implement setup of an Abis service link between a base transceiver station (BTS) and a base station controller (BSC, Base Station Controller), an A2 service link between the BSC and a mobile switching center (MSC, Mobile Switching Center), an A3 service link between two BSCs, and the like. The signaling exchange required by the setup of the service links causes signaling between internal modules of the BSC to increase exponentially. Especially, formation of the signaling for setup/teardown of the links imposes a signaling impact on an interface board and a signaling processing unit (SPU) of the existing BSC, which causes the interface board and the SPU of the BSC to become a processing bottleneck.

Refer to FIG. 1A, FIG. 1B, FIG. 2A, and FIG. 2B. FIG. 1A and FIG. 1B are schematic flowcharts of signaling exchange for setting up a call leg and releasing a call leg respectively between a BSC and a BTS in the prior art. FIG. 2A and FIG. 2B are schematic flowcharts of signaling exchange for setting up a call leg and releasing a call leg respectively between a source BSC and a target BSC during a soft handoff in the prior art.

Specifically, in a signaling exchange process for setting up a call leg, which is shown in FIG. 1A, when the call leg is set up by exchanging call setup request signaling and call setup acknowledgement signaling (Abis Setup Req/Abis Setup Ack) in Abis interface signaling between the BSC and the BTS, information about logical resources occupied by the call leg currently set up needs to be notified to a peer network element by exchanging link setup signaling between network elements, that is, call connection signaling and call connection acknowledgement signaling (Abis Connect/Abis Connect Ack), and then according to the received information about logical resources, the internal modules of the BSC perform internal signaling exchange (indicated by an arrow without texts in FIG. 1A) to implement resource allocation and setup for service links of the Abis interface.

In a signaling exchange process for releasing a call leg shown in FIG. 1B, when the call leg is released by exchanging call release request signaling and call release acknowledgement signaling (Abis Release Req/Abis Release Ack) in Abis interface signaling between the BSC and the BTS, information about logical resources occupied by the call leg currently released needs to be notified to a peer network element by exchanging link teardown signaling between network elements, that is, call removal signaling and call removal acknowledgement signaling (Abis Remove/Abis Remove Ack), and then according to the received information about logical resources, the internal modules of the BSC perform internal signaling exchange (indicated by an arrow without texts in FIG. 1B) to implement resource release and teardown for the service links of the Abis interface.

In a signaling exchange process for setting up a call leg during a soft handoff, which is shown in FIG. 2A, when a soft handoff leg is set up by exchanging call setup request signaling and call setup acknowledgement signaling, that is, handoff request signaling and handoff request acknowledgement signaling (A7 Handoff Request/A7 Handoff Request Ack) in 3GPP2 IOS A7 interface signaling between the source BSC and the target BSC, service link setup needs to be implemented between the source BSC and the target BSC and between the target BSC and the target BTS by exchanging link setup signaling between network elements, that is, call connection signaling and call connection acknowledgement signaling (A3 Connect/A3 Connect Ack and Abis Connect/Abis Connect Ack). Internal signaling exchange (indicated by an arrow without texts in FIG. 2A) also needs to be performed between internal modules of each BSC to implement resource allocation and setup for service links of the A3 interface and the Abis interface.

In a signaling exchange process for releasing a call leg during a soft handoff, which is shown in FIG. 2B, when a soft handoff leg is released by exchanging call release request signaling and call release acknowledgement signaling, that is, release target signaling and release target acknowledgement signaling (A7 Drop Target/A7 Drop Target Ack) in 3GPP2 IOS A7 interface signaling between the source BSC and the target BSC, service link teardown needs to be implemented between the source BSC and the target BSC and between the target BSC and the target BTS by exchanging link teardown signaling between network elements, that is, call removal signaling and call removal acknowledgement signaling (A3 Remove/A3 Remove Ack and Abis Remove/Abis Remove Ack). Internal signaling exchange (indicated by an arrow without texts in FIG. 2B) also needs to be performed between internal modules of the BSC to implement resource release and teardown for service links of the A3 interface and the Abis interface.

In the prior art, between the BSC and the BTS, not only call setup and call release are implemented by exchanging signaling, but also service links of the Abis interface of the call leg need to be set up and torn down by exchanging signaling; between the source BSC and the target BSC, not only a handoff is implemented by exchanging signaling, but also the 3GPP2 IOS A3 interface link needs to be set up and torn down by exchanging signaling; and furthermore, resource allocation and setup, and therefore resource release and teardown of service links need to be implemented between internal modules of the BSC by exchanging signaling.

Generally, a CDMA call requires more than 10 soft handoffs averagely; in a link setup process during the setup of a call leg, the BSC needs to consume about 50 to 60 pieces of signaling overhead, and when the call leg is released, link teardown also needs to be implemented by exchanging signaling. Consequently, a signaling process is complicated and a signaling plane load increases massively, which reduces call access capabilities.

Therefore, how to simplify the signaling exchange process during the setup/release of a call leg and reduce the control plane load and enhance capabilities of the signaling processing unit to cope with the signaling storm impact brought by smart terminals is one of urgent problems to be solved currently.

SUMMARY

Embodiments of the present invention provide a call processing method and an access network element in a mobile communications system to fulfill an objective of saving signaling overhead in a process of setting up a call leg.

Specifically, a call processing method in a mobile communications system according to an embodiment of the present invention includes the following steps: sending, by an access network element, first signaling to a peer network element, where the first signaling carries a first call leg identifier (ID) that identifies a logical resource allocated by the access network element to a call leg; receiving, by the access network element, a service packet sent by the peer network element, where the service packet includes the first call leg identifier; and addressing, by the access network element according to the first call leg identifier, the logical resource allocated by the access network element to the call leg, and sending the service packet to the logical resource, so that the logical resource processes the service packet.

Optionally, the call processing method in the mobile communications system further include the following steps: receiving, by the access network element, second signaling sent by the peer network element, where the second signaling carries a second call leg identifier that identifies a logical resource allocated by the peer network element to the call leg; and sending, by the access network element, a service packet that includes the second call leg identifier to the peer network element, so that the peer network element addresses, according to the second call leg identifier, the logical resource allocated by the peer network element to the call leg and sends the service packet to the logical resource, so that the logical resource processes the service packet.

Optionally, the call processing method in the mobile communications system further include the following steps: sending, by the access network element, third signaling to the peer network element to request releasing of a service link between the access network element and the peer network element; and releasing, by the access network element, the service link after receiving fourth signaling sent by the peer network element.

Optionally, in the call processing method in the mobile communications system, the first signaling includes Abis interface signaling.

Optionally, in the call processing method in the mobile communications system, the access network element are exemplarily a base station controller in the mobile communications system, and content of the first call leg identifier includes at least one of the following: a base station controller identifier, a subrack ID, a slot ID, a destination signaling point index, a service packet processing unit control block index, an uplink/downlink flag, a soft handoff leg, and a channel type.

Optionally, in the call processing method in the mobile communications system, the access network element and the peer network element are exemplarily a base station and a base station controller in the mobile communications system respectively, and content of the first call leg identifier includes at least one of the following: a base station controller identifier, a base station identifier, a slot ID, a channel processing unit identifier, a service link index, and an uplink/downlink flag.

Optionally, in the call processing method in the mobile communications system, the sending, by an access network element, first signaling to a peer network element exemplarily includes: sending fifth signaling that carries the first call leg identifier to a third access network element, so that the third access network element sends sixth signaling that carries the first call leg identifier to the peer network element, where the first signaling includes the fifth signaling and the sixth signaling, and the fifth signaling and the sixth signaling are interface signaling of different types. More specifically, the fifth signaling is exemplarily handoff request signaling in 3GPP2 IOS A7 interface signaling, and the sixth signaling is call setup request signaling in Abis interface signaling; or the fifth signaling is exemplarily call setup acknowledgement signaling in Abis interface signaling, and the sixth signaling is handoff request acknowledgement signaling in 3GPP2 IOS A7 interface signaling.

Optionally, in the call processing method in the mobile communications system, the sending, by the access network element, third signaling to the peer network element exemplarily includes: sending seventh signaling to a third access network element, so that the third access network element sends eighth signaling to the peer network element, where the third signaling includes the seventh signaling and the eighth signaling, and the seventh signaling and the eighth signaling are interface signaling of different types. More specifically, the seventh signaling is exemplarily release target signaling in 3GPP2 IOS A7 interface signaling, and the eighth signaling is call release request signaling in Abis interface signaling.

An access network element according to another embodiment of the present invention includes a transmitter, a receiver, and a processor. The transmitter is configured to send first signaling that carries a first call leg identifier to a peer network element, where the first call leg identifier identifies a logical resource allocated by the access network element to a call leg; the receiver is configured to receive a service packet sent by the peer network element, where the service packet includes the first call leg identifier; and the processor is configured to address, according to the first call leg identifier, the logical resource allocated by the access network element to the call leg, and send the service packet to the logical resource, so that the logical resource processes the service packet.

Optionally, the receiver is exemplarily further configured to receive second signaling that is sent by the peer network element and carries a second call leg identifier, where the second call leg identifier identifies a logical resource allocated by the peer network element to the call leg; and the transmitter is further configured to send a service packet that includes the second call leg identifier to the peer network element, so that the peer network element addresses, according to the second call leg identifier, the logical resource allocated by the peer network element to the call leg and sends the service packet to the logical resource, so that the logical resource processes the service packet.

Optionally, the transmitter is exemplarily further configured to send third signaling to the peer network element to request releasing of a service link between the access network element and the peer network element; the receiver is configured to receive fourth signaling sent by the peer network element; and the processor is further configured to release the service link after the receiver receives the fourth signaling sent by the peer network element.

Optionally, in the access network element, the first signaling exemplarily includes Abis interface signaling.

Optionally, the access network element is exemplarily a base station controller in a mobile communications system, and content of the first call leg identifier includes at least one of the following: a base station controller identifier, a subrack ID, a slot ID, a destination signaling point index, a service packet processing unit control block index, an uplink/downlink flag, a soft handoff leg, and a channel type.

Optionally, the access network element and the peer network element are exemplarily a base station and a base station controller in a mobile communications system respectively, and content of the first call leg identifier includes at least one of the following: a base station controller identifier, a base station identifier, a slot ID, a channel processing unit identifier, a service link index, and an uplink/downlink flag.

Optionally, the access network element is exemplarily a network element device in one of the following: a code division multiple access system, a global system for mobile communications, a universal mobile telecommunications system, a transport network, and a fixed network.

Optionally, in the access network element, exemplarily, the transmitter is specifically configured to send fifth signaling that carries the first call leg identifier to a third access network element, so that the third access network element sends sixth signaling that carries the first call leg identifier to the peer network element, where the first signaling includes the fifth signaling and the sixth signaling, and the fifth signaling and the sixth signaling are interface signaling of different types. More specifically, the fifth signaling is exemplarily handoff request signaling in 3GPP2 IOS A7 interface signaling, and the sixth signaling is call setup request signaling in Abis interface signaling; or the fifth signaling is exemplarily call setup acknowledgement signaling in Abis interface signaling, and the sixth signaling is handoff request acknowledgement signaling in 3GPP2 IOS A7 interface signaling.

Optionally, in the access network element, exemplarily, the transmitter is specifically configured to send seventh signaling to a third access network element, so that the third access network element sends eighth signaling to the peer network element, where the third signaling includes the seventh signaling and the eighth signaling, and the seventh signaling and the eighth signaling are interface signaling of different types. More specifically, the seventh signaling is exemplarily release target signaling in 3GPP2 IOS A7 interface signaling, and the eighth signaling is call release request signaling in Abis interface signaling.

Each of the foregoing embodiments of the present invention can achieve the following beneficial effects: Due to the configuration of the call leg identifier, the embodiment of the present invention simplifies a signaling exchange process for setting up a call leg between access network elements, for example, between a base station and a base station controller, and setting up a call leg during a soft handoff between base station controllers, thereby massively reducing signaling overhead for service link setup in the process of setting up each call leg. For example, the signaling overhead saved in one call process is up to about 50 to 60 messages, which accounts for about 30% of the total overhead. Therefore, performance of a signaling board of the access network element is greatly improved, and call access capabilities of a single signaling processing unit are enhanced.

The foregoing description is only a brief description of the technical solutions of the present invention. To enable clearer understanding of technical means of the present invention and enable the present invention to be implemented according to content of the specification, and make the foregoing and other objectives, features, and advantages of the present invention more apparent and comprehensible, the following gives a detailed description with reference to exemplary embodiments and accompanying drawings.

DETAILED DESCRIPTION OF ILLUSTRATIVE EMBODIMENTS

Figure 1A:
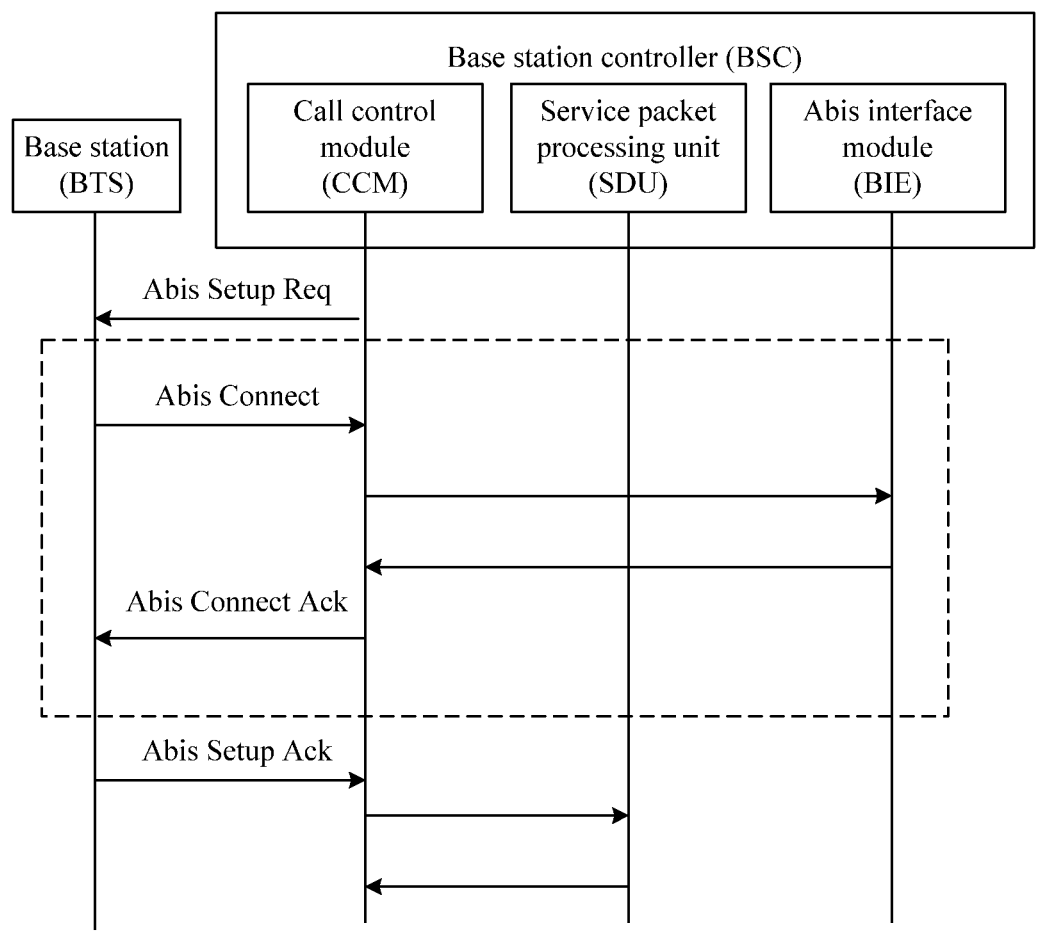
FIG. 1A is a schematic flowchart of signaling exchange for setting up a call leg between a BSC and a BTS in the prior art.

To further describe the technical means used to achieve the predetermined objectives of the present invention and efficacy of the present invention, the following describes in detail a call processing method and an access network element in a mobile communications system that are put forward according to the present invention, and specific implementation manners, methods, steps, and efficacy thereof with reference to accompanying drawings and exemplary embodiments.

The foregoing and other technical content, features, and efficacy of the present invention are clearly presented in the following detailed description about the exemplary embodiments with reference to accompanying drawings. The description about the specific implementation manners is intended to enable deeper and specific understanding of the technical means used to achieve the predetermined objectives of the present invention and efficacy of the present invention. However, the accompanying drawings are provided for reference and illustration but are not intended to limit the present invention. The method provided in the present invention includes: sending, by an access network element, first signaling to a peer network element, where the first signaling carries a first call leg identifier that identifies a logical resource allocated by the access network element to a call leg; receiving, by the access network element, a service packet sent by the peer network element, where the service packet includes the first call leg identifier; and addressing, by the access network element according to the first call leg identifier, the logical resource allocated by the access network element to the call leg, and sending the service packet to the logical resource, so that the logical resource processes the service packet. In the signaling exchange process for setting up a call leg, a call leg identifier that identifies the logical resource allocated by the access network element to the call leg is carried, thereby reducing signaling exchange caused by setup or release of a service link between access network elements in the prior art, saving signaling overhead in a call process, and enhancing call access capabilities of the mobile communications system effectively. In addition, after the service link between the access network elements is set up, service packets can be forwarded between the access network elements in a self-addressing manner.

The following describes the method of the present invention by using specific embodiments.

Before the specific embodiments of the present invention are described, basic concepts are defined first: A call leg identifier, BSC_CCLI, corresponding to a BSC and a call leg identifier, BTS_CCLI, corresponding to a BTS: BSC is an acronym of a base station controller (Base Station Controller) and BTS is an acronym of a base station (Base Transceiver Station); generally, the BSC and the BTS together form a base station subsystem (Base Station Subsystem, BSS), the BSC belongs to a control part of the BSS and performs control and management on the BTS over an Abis interface, and the BTS is responsible for radio transmission of the system; and in the BSS, one BSC may control multiple BTSs as required by a traffic volume.

Specifically, the BSC_CCLI is a code division multiple access call leg identifier (CDMA Call Leg Identifier) of the BSC, and in a CDMA network, is used to uniquely identify a logical resource occupied by a CDMA call leg in the BSC; and the BSC_CCLI is planned as follows:

| | 7 | 6 | 5 | 4 | 3 | 2 | 1 | 0 |
|---|---|---|---|---|---|---|---|---|
| 1 | BSC identifier | | | | | | | Reserved bit |
| 2 | Subrack ID | | | | Slot ID (higher 3 bits) | | | Uplink/downlink flag |
| 3 | Slot ID (lower 2 bits) | | Destination signaling point index | | | | | |
| 4 | SDU control block index | | | | | | | |
| 5 | Soft handoff leg | | | Channel type | | | Reserved | | uplink/downlink flag: identifies an uplink or a downlink, where 0 indicates an uplink and 1 indicates a downlink;
BSC identifier: occupies 7 bits and has a value range of 0 to 127;
subrack ID (subrack ID): occupies 4 bits and has a value range of 0 to 9;
slot ID (slot ID): occupies 5 bits and has a value range of 0 to 27;
destination signaling point index (destination signaling point index, DSP index): occupies 6 bits and has a value range of 0 to 27;
SDU control block index (selective distribution unit control block index, SCB index): occupies 8 bits and supports 255;
soft handoff leg (soft handoff leg): occupies 3 bits and has a value range of 0 to 5; and
channel type (channel type): denotes FCH, SCH0, SCH1, and the like, and occupies 3 bits.

The foregoing BSC_CCLI can be used to uniquely determine which BSC and which subrack in a CDMA network are a place where frame processing of a specific CDMA call leg is performed, and which control block resource of which destination signaling point is occupied by an SDU (Service Distribution Unit) in a specific slot.

BTS_CCLI (CDMA Call Leg Identifier) is an acronym of BTS code division multiple access call leg identifier, and in a CDMA network, is used to uniquely identify a logical resource occupied by a CDMA call leg in the BTS; and the BTS_CCLI is planned as follows:

| | 7 | 6 | 5 | 4 | 3 | 2 | 1 | 0 |
|---|---|---|---|---|---|---|---|---|
| 1 | BSC identifier | | | | | | | Reserved bit |
| 2 | BTS identifier (lower 7 bits) | | | | | | | Uplink/downlink flag |

| 7 | 6 | 5 | 4 | 3 | 2 | 1 | 0 |
|---|---|---|---|---|---|---|---|
| 3 | BTS identifier (higher 5 bits) | | | | Channel processing unit identifier (higher 3 bits) | | |
| 4 | Service link index | | | | Slot ID | | |
| 5 | Channel processing unit identifier (lower 8 bits) | | | | | | | uplink/downlink flag: identifies an uplink or a downlink, where 0 indicates an uplink and 1 indicates a downlink;
BSC identifier: occupies 7 bits and has a value range of 0 to 127;
BTS identifier: occupies 12 bits and has a value range of 0 to 4096;
traffic link index: occupies 4 bits;
slot ID (slot ID): occupies 4 bits; and
channel processing unit identifier (channel element ID): occupies 11 bits.

The foregoing BTS_CCLI can be used to uniquely determine from which channel processing unit resource of a BTS controlled by which BSC in a CDMA network a CDMA call leg comes.

In addition, because an interface board of a BSC is a key part for implementing service packet addressing, before a call leg is set up, the following data configuration needs to be performed to implement addressing of the service packet. Specifically, for an uplink direction (a direction from the BTS to the BSC, which is also called a reverse direction): (I) a BSC identifier of this BSC; (II) a mapping relationship between a BSC identifier of a remote BSC and a BSC IP address; and (III) a mapping relationship between a subrack, a slot, a destination signaling point index, and an internal IP address in a BSC. For a downlink direction (a direction from the BSC to the BTS, which is also called a forward direction): (i) a BSC identifier of this BSC; (ii) a mapping relationship between a BSC identifier of a remote BSC and a BSC IP address; and (iii) a mapping relationship between a BTS identifier, a service link index, and a BTS IP address.

The following describes in detail, with reference to FIG. 3A, FIG. 3B, FIG. 4A, and FIG. 4B, a CDMA call processing method provided in an embodiment of the present invention.

Figure 3A:
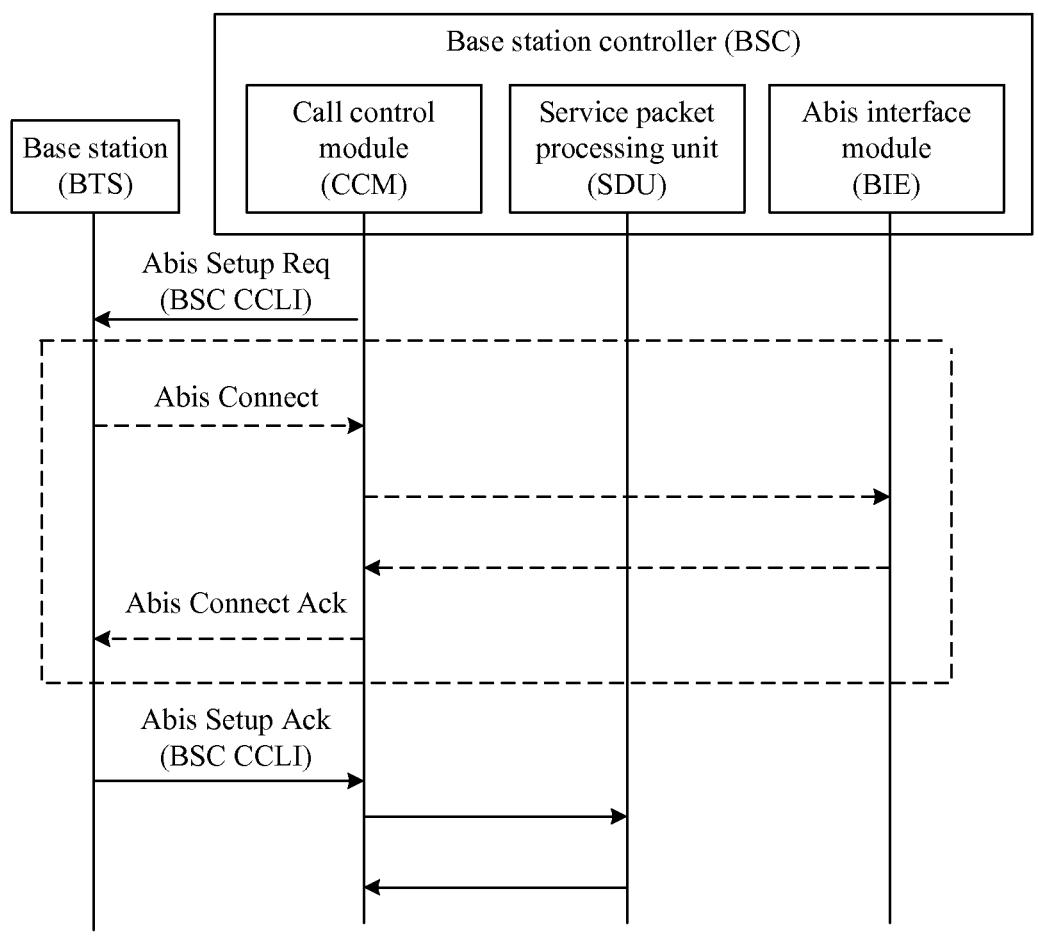
FIG. 3A is a schematic flowchart of signaling exchange for setting up a call leg between a BSC and a BTS according to an embodiment of the present invention.

Specifically, FIG. 3A is a schematic flowchart of signaling exchange for setting up a call leg between a BSC and a BTS. In the process of setting up a call leg between the BSC and the BTS, the BSC carries a BSC_CCLI to a peer network element BTS by using call setup request signaling (Abis Setup Req) in Abis interface signaling, and the BTS carries a BTS_CCLI to an SDU of the peer network element BSC by using call setup acknowledgement signaling (Abis Setup Ack) in the Abis interface signaling. In this way, resource allocation and setup of an Abis interface service link between the BSC and the BTS are implemented. Therefore, exchange of call connection signaling and call connection acknowledgement signaling (Abis Connect/Abis Connect Ack) shown in a rectangular dashed box in FIG. 1A, and exchange of signaling between internal modules of the BSC arising therefrom in the prior art are no longer required (as indicated by a dashed arrow in a rectangular dashed box in FIG. 3A). In this way, a signaling exchange process of an Abis interface board in the prior art is optimized, and signaling overhead in the process of setting up a call leg between the BSC and the BTS is reduced.

After the Abis interface service link is set up, service packets are forwarded between the BSC and the BTS in a self-addressing manner.

(a) When the BTS sends an uplink service packet (uplink), a service payload header in the service packet carries a BSC_CCLI as routing table information for addressing in the BSC, and the uplink service packet is sent to an interface board of the BSC. When receiving the uplink service packet, the interface board of the BSC parses out the BSC_CCLI carried in the service payload header in the service packet to implement service link self-addressing (that is, a logical resource allocated by the BSC to the call leg is addressed according to the BSC_CCLI), and forwards the service packet to an SDU of the BSC for processing.

(b) When the SDU of the BSC sends a downlink service packet (downlink), a service payload header in the service packet carries a BTS_CCLI as routing table information for addressing in the BSC and BTS, and the service packet is sent to the interface board of the BSC. The interface board forwards the service packet to the BTS according to logical address information of the BTS_CCLI carried in the service payload header, and the BTS parses out the BTS_CCLI carried in the service payload header to implement service link self-addressing (that is, a logical resource allocated by the BTS to the call leg is addressed according to the BTS_CCLI), and forwards the service packet to a target channel processing unit of the BTS for processing.

Figure 1B:
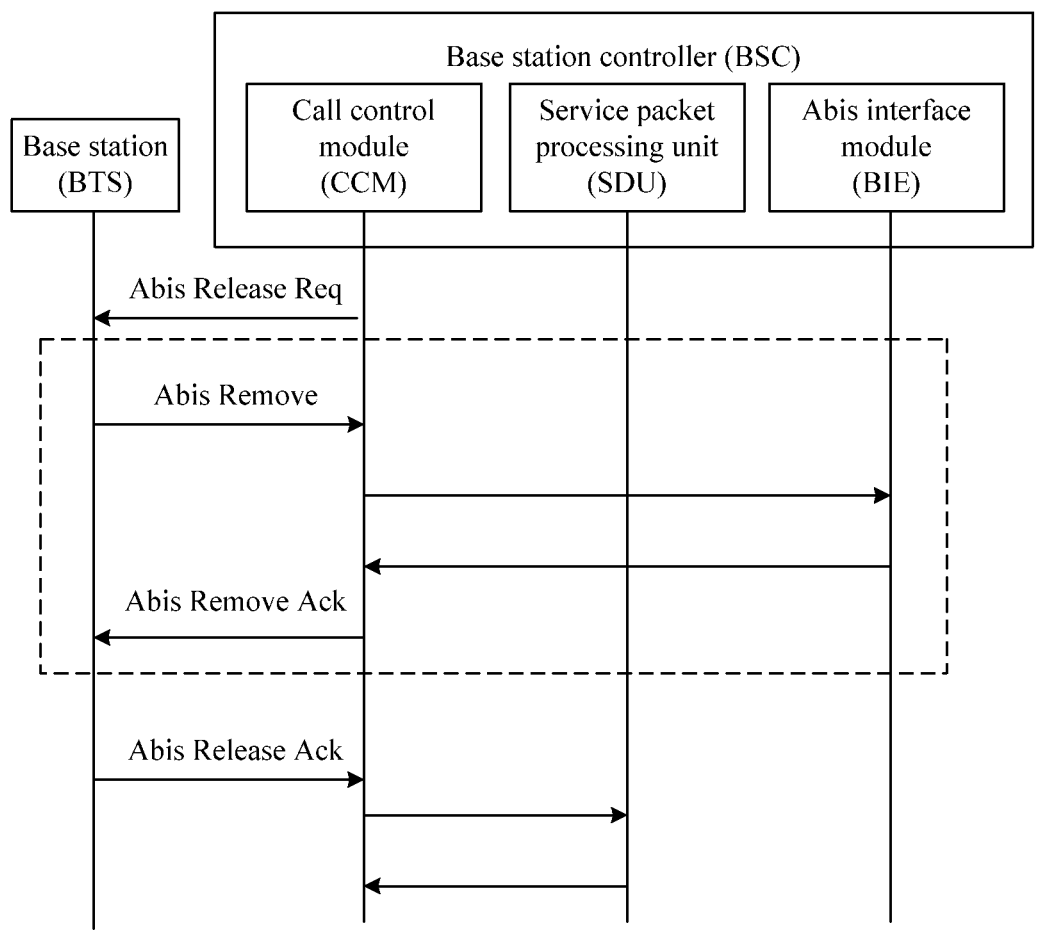
FIG. 1B is a schematic flowchart of signaling exchange for releasing a call leg between a BSC and a BTS in the prior art.
Figure 3B:
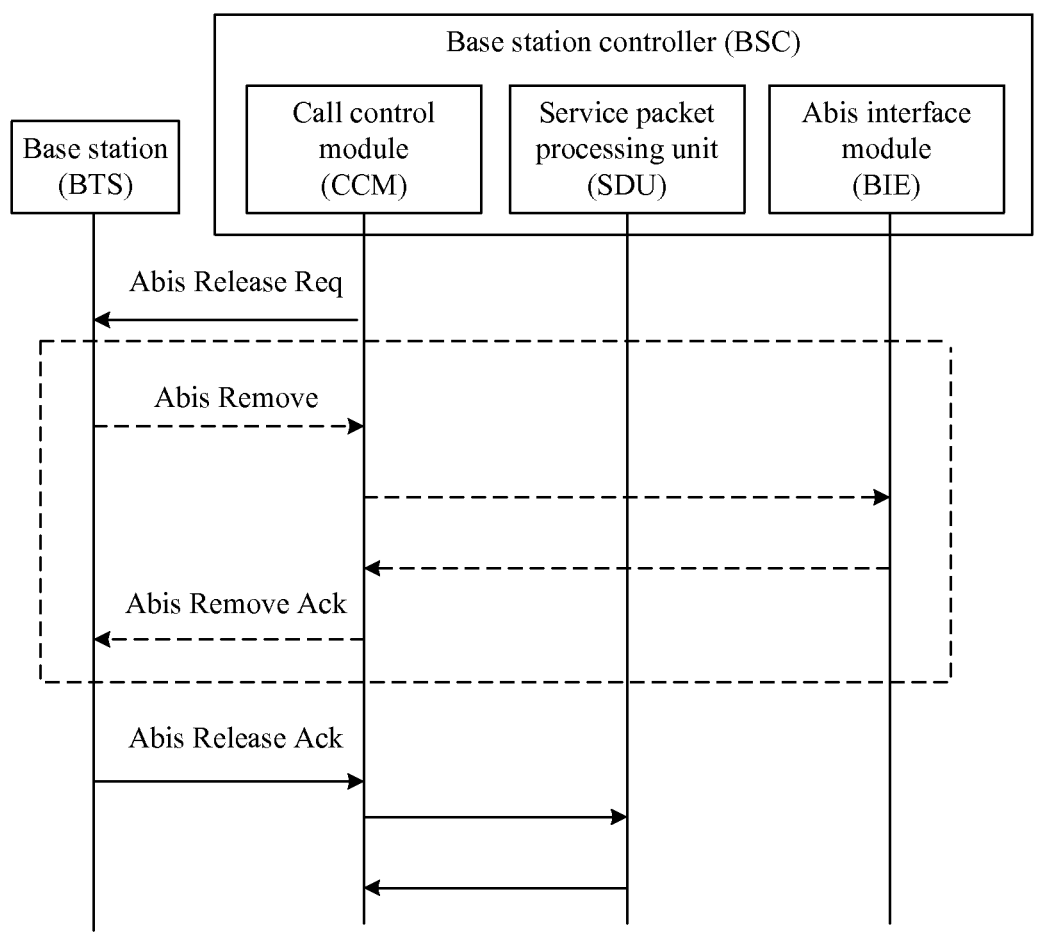
FIG. 3B is a schematic flowchart of signaling exchange for releasing a call leg between a BSC and a BTS according to an embodiment of the present invention.

FIG. 3B is a schematic flowchart of signaling exchange for releasing a call leg between a BSC and a BTS. In the process of releasing a call leg between the BSC and the BTS, no link setup signaling (Abis Connect/Abis Connect Ack) is exchanged for setting up the call leg between the BSC and the BTS, and therefore, exchange of link teardown signaling shown in a rectangular dashed box in FIG. 1B, that is, call removal signaling and call removal acknowledgement signaling (Abis Remove/Abis Remove Ack), and exchange of signaling between internal modules of the BSC arising therefrom in the prior art are no longer required (as indicated by a dashed arrow in a rectangular dashed box in FIG. 3B). Instead, resource release and teardown of the Abis interface service link are implemented by exchanging call release request signaling and call release acknowledgement signaling (Abis Release Req/Abis Release Ack) in the Abis interface signaling directly. In this way, signaling overhead in the process of releasing the call leg between the BSC and the BTS is reduced.

Figure 2A:
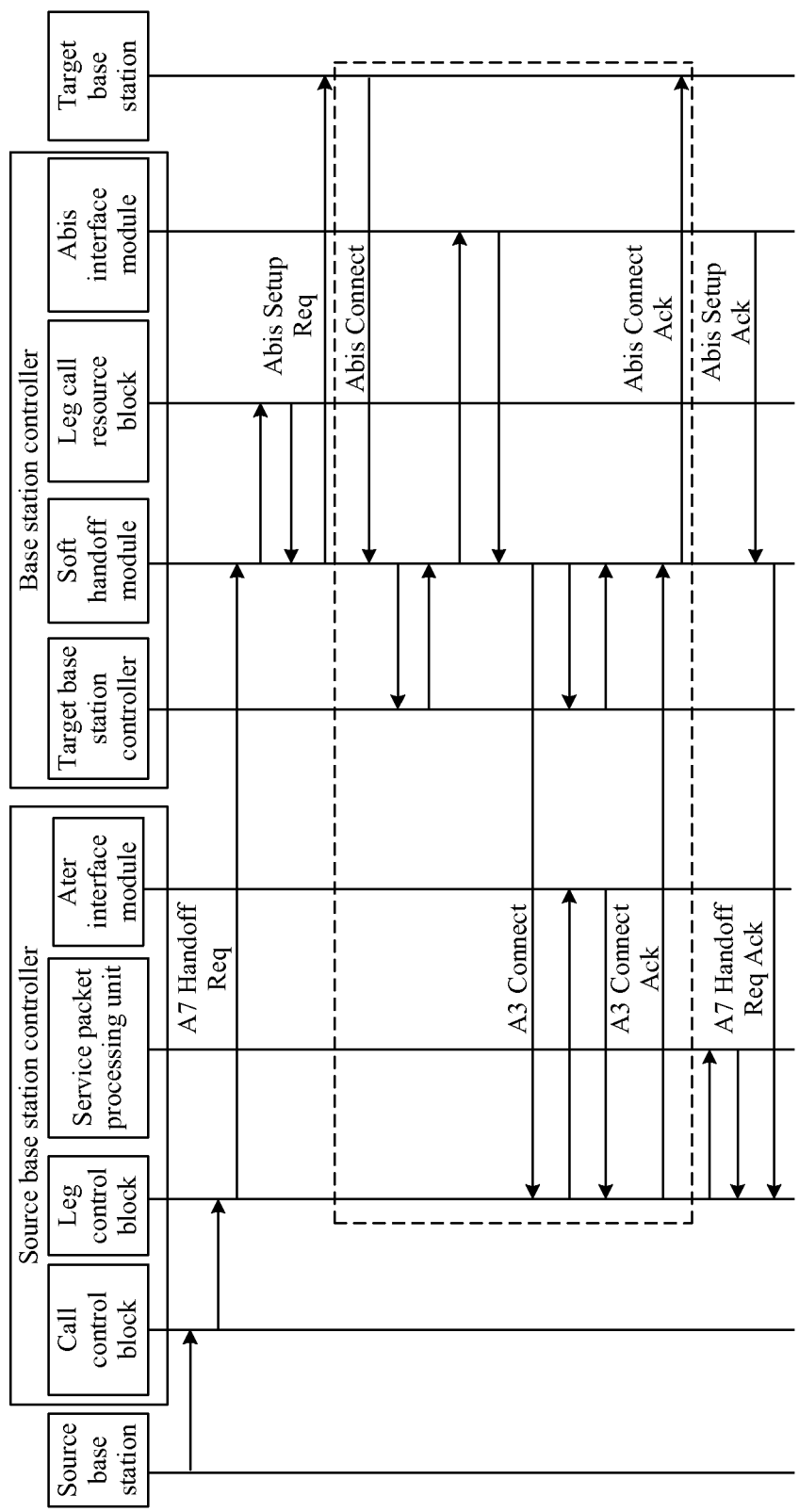
FIG. 2A is a schematic flowchart of signaling exchange for setting up a call leg between a source BSC and a target BSC during a soft handoff in the prior art.
Figure 4A:
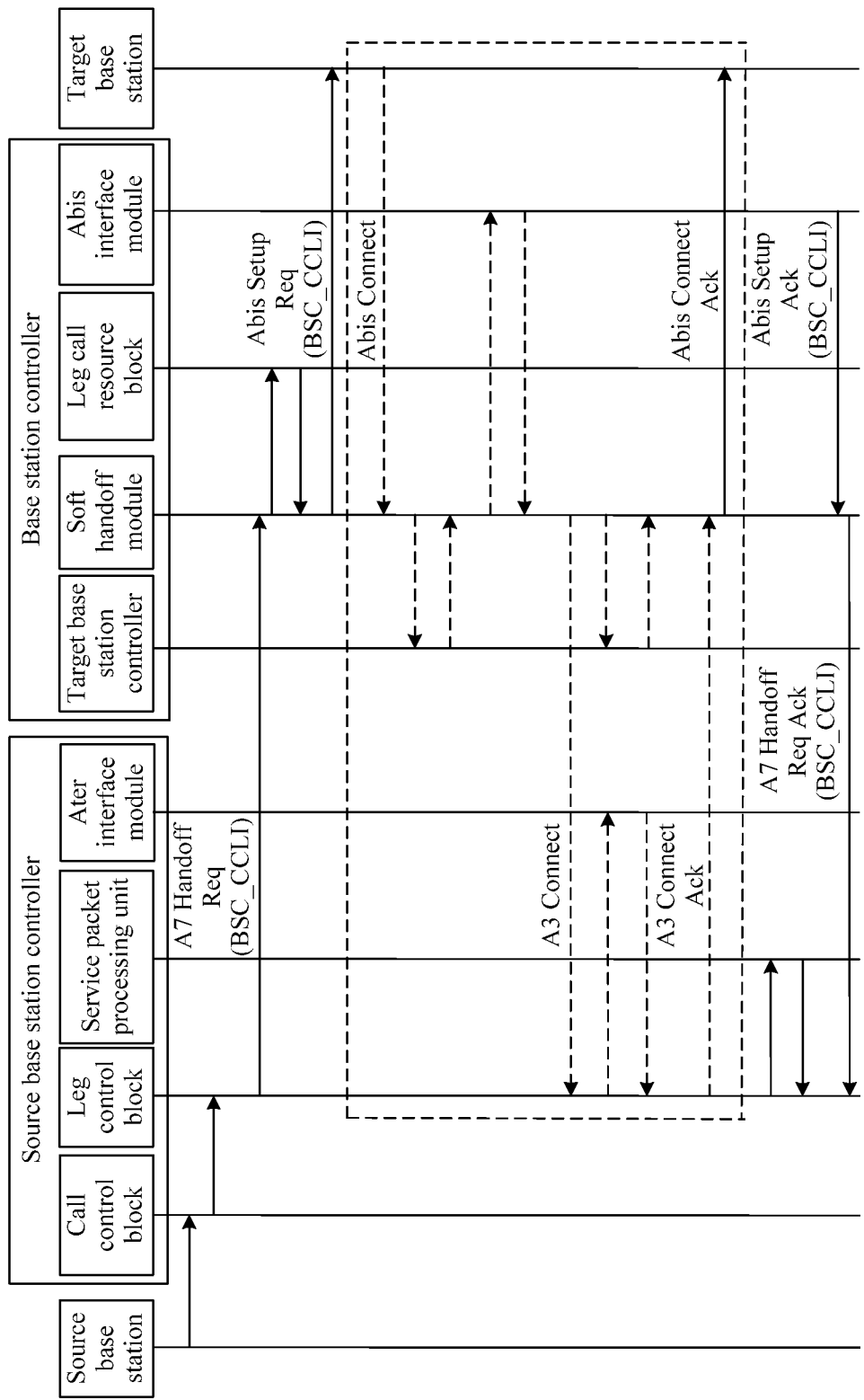
FIG. 4A is a schematic flowchart of signaling exchange for setting up a call leg between a source BSC and a target BSC during a soft handoff according to an embodiment of the present invention.

FIG. 4A is a schematic flowchart of signaling exchange for setting up a call leg between a source BSC and a target BSC during a soft handoff. In the process of setting up a call leg between BSCs during a soft handoff, a source BSC carries, by using call setup request signaling, that is, handoff request signaling (A7 Handoff Req) in 3GPP2 IOS A7 interface signaling, a BSC_CCLI for delivering to a target BSC, and then the target BSC carries, by using call setup request signaling (Abis Setup Req) in the Abis interface signaling, the BSC_CCLI for forwarding to the peer network element, that is, a target BTS. The target BTS carries, by using call setup acknowledgement signaling (Abis Setup Ack) in the Abis interface signaling, the BTS_CCLI for sending to the target BSC, and then the target BSC carries, by using call setup acknowledgement signaling, that is, handoff request acknowledgement signaling (A7 Handoff Req Ack) in the 3GPP2 IOS A7 interface signaling, the BTS_CCLI for forwarding to the peer network element, that is, a source BSC, thereby implementing resource allocation and setup of an A3 interface service link between the source BSC and the target BSC, and resource allocation and setup of an Abis interface service link between the target BSC and the target BTS. Therefore, exchange of call connection signaling and call connection acknowledgement signaling (A3 Connect/A3 Connect Ack) in a standard process of the 3GPP2 IOS A interface in a rectangular dashed box shown in FIG. 2A, exchange of call connection signaling and call connection acknowledgement signaling (Abis Connect/Abis Connect Ack) of the Abis interface, and signaling exchange between internal modules of the BSC arising therefrom in the prior art are no longer required (as indicated by a dashed arrow in a rectangular dashed box in FIG. 4A), thereby optimizing a standard signaling exchange process between the BSCs with the existing standard 3GPP2 IOS A interface and reducing signaling overhead in the process of setting up a call leg between the BSCs during a soft handoff.

After an A3 interface service link is set up between the source BSC and the target BSC, service packets are forwarded between the BSCs in a self-addressing manner: (A) When the target BTS sends an uplink service packet to the source BSC (uplink), a service payload header in the service packet carries a BSC_CCLI as routing table information for addressing in the target BSC and source BSC. When the service packet is forwarded by the target BSC to the source BSC, the target BSC implements service link self-addressing by parsing out the BSC_CCLI in the service packet, and sends the service packet to an interface board of the source BSC. The interface board of the source BSC parses out the BSC_CCLI and addresses a location of a service packet processing unit (also known as SDU, service distribution unit), and forwards the service packet to the SDU. (B) When the source BSC sends a downlink service packet to the target BTS (downlink), a service payload header carries a BTS_CCLI as routing table information for addressing in the source BSC, the target BSC, and the target BTS. When the service packet is sent from the source BSC to the target BSC, the source BSC implements service link self-addressing by parsing out the BTS_CCLI in the service packet, and sends the service packet to an interface board of the target BSC. The interface board of the target BSC parses out the BTS_CCLI and addresses a location of a channel processing unit of the target BTS, and delivers the service packet to the channel processing unit.

Figure 2B:
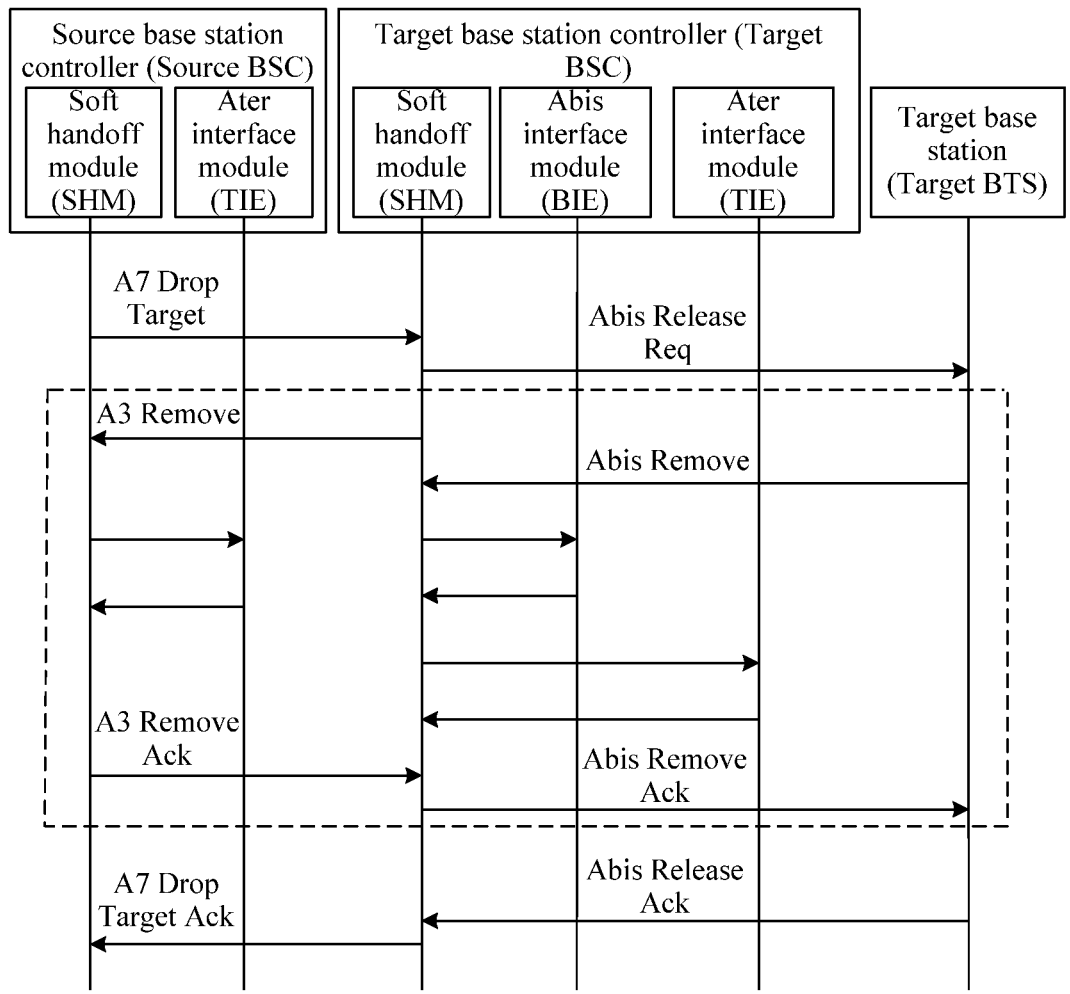
FIG. 2B is a schematic flowchart of signaling exchange for releasing a call leg between a source BSC and a target BSC during a soft handoff in the prior art.
Figure 4B:
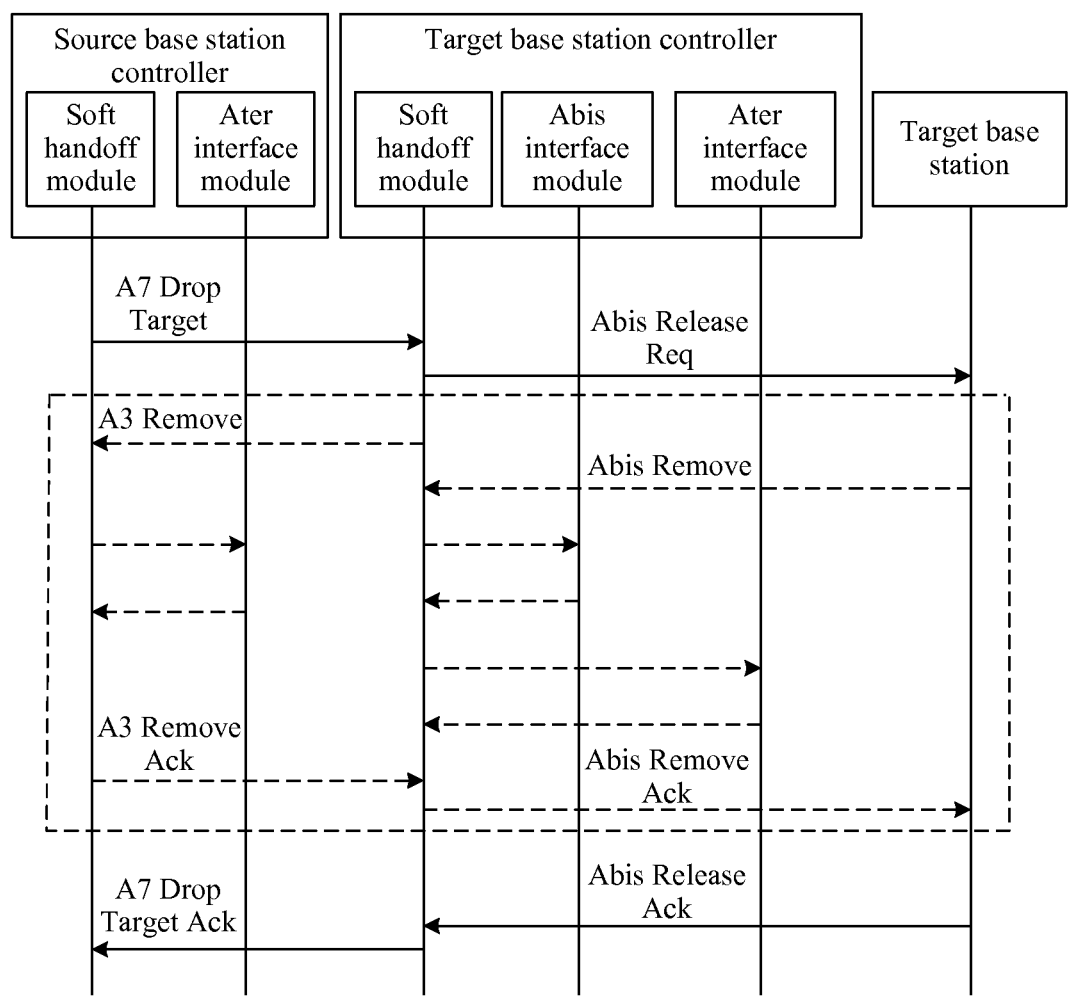
FIG. 4B is a schematic flowchart of signaling exchange for releasing a call leg between a source BSC and a target BSC during a soft handoff according to an embodiment of the present invention.

FIG. 4B is a schematic flowchart of signaling exchange for releasing a call leg between a source BSC and a target BSC during a soft handoff. In the process of releasing a call leg between BSCs during a soft handoff, no link setup signaling (A3 Connect/A3 Connect Ack and Abis Connect/Abis Connect Ack) is exchanged when setting up a call leg between a source BSC and a target BSC and between a target BSC and a target BTS, and therefore, exchange of link teardown signaling (A3 Remove/A3 Remove Ack and Abis Remove/Abis Remove Ack) in a rectangular dashed box shown in FIG. 2B, and exchange of signaling between internal modules of the BSC arising therefrom in the prior art are no longer required (as indicated by a dashed arrow in a rectangular dashed box in FIG. 4B). Instead, call release request signaling and call release acknowledgement signaling in the 3GPP2 IOS A7 interface signaling, that is, release target signaling and release target acknowledgement signaling (A7 Drop Target/A7 Drop Target Ack), are exchanged directly to implement resource release and teardown of an A3 interface service link, and call release request signaling and call release acknowledgement signaling (Abis Release Req/Abis Release Ack) are exchanged to implement resource release and teardown of an Abis interface service link.

From the foregoing description, it can be seen that the CDMA call processing method provided in the foregoing embodiment can have the following beneficial effects:

(1) Because the link setup signaling is saved, the signaling exchange process for setting up a call leg between the BSC and the BTS and setting up a call leg between the BSCs during a soft handoff is simplified, and signaling overhead required for resource allocation and setup of a service link between the BSC and the BTS and signaling overhead required for resource allocation and setup of a service link between the BSCs in the process of setting up a call leg are reduced. For example, the signaling overhead saved in a call process may be up to about 50 to 60 messages, which accounts for about 30% of total overhead.

(2) Because the link teardown signaling is saved, the signaling exchange process for releasing a call leg between the BSC and the BTS and releasing a call leg between the BSCs during a soft handoff is simplified, and signaling overhead required for resource release and teardown of the service link between the BSC and the BTS and signaling overhead required for resource release and teardown of the service link between the BSCs in the process of releasing a call leg are reduced. For example, the signaling overhead saved in a call process may be up to about 50 to 60 messages, which accounts for about 30% of total overhead.

Therefore, the CDMA call processing method in the embodiment of the present invention can reduce call and soft handoff signaling overhead effectively by about 30% in theory, which improves performance of a signaling board of a BSC significantly and enhances call access capabilities of a single signaling processing unit.

It should be noted that the CDMA call processing method in the embodiment of the present invention is merely an example of the call processing method in the mobile communications system in the present invention. The call processing method in the mobile communications system in the present invention is not only applicable to access network elements in a code division multiple access system (including WCDMA, CDMA2000, TD-SCDMA, and the like), but also applicable between access network elements of other standards, for example, between access network elements (such as a base station controller BSC and a base station BTS) of a global system for mobile communications (GSM), and between access network elements (such as a radio network controller RNC and a NodeB) of a universal mobile telecommunications system (UMTS). In addition, for other telecommunications devices such as a fixed network device and a transport network device, the call processing method in the mobile communications system in the present invention can also be applied to fulfill the objective of saving signaling overhead.

In addition, access network elements that are peer network elements of each other and are mentioned in the foregoing call processing method in the mobile communications system may separately constitute, or a combination thereof may constitute, a call processing apparatus in the mobile communications system in the embodiment of the present invention to implement the call processing method in the mobile communications system described in the foregoing embodiment. The basic architecture of each access network element is described in more detail with reference to FIG. 5.

Figure 5:
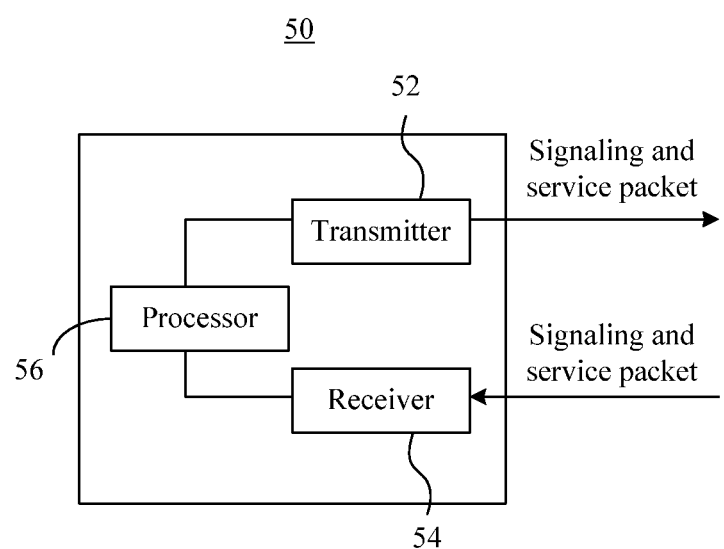
FIG. 5 is a schematic diagram of a basic architecture of an access network element according to an embodiment of the present invention.

Specifically, FIG. 5 is a schematic diagram of a basic architecture of an access network element according to an embodiment of the present invention. As shown in FIG. 5, an access network element 50 primarily includes a transmitter 52, a receiver 54, and a processor 56, and the processor 56 is electrically connected to the transmitter 52 and the receiver 54 respectively.

The transmitter 52 is primarily configured to send signaling and a service packet. For example, if the access network element 50 is a BSC in FIG. 3A and FIG. 3B, the transmitter 52 may send call setup request signaling (Abis Setup Req) in Abis interface signaling to carry a BSC_CCLI to a peer network element BTS, and may send call release request signaling (Abis Release Req) in the Abis interface signaling to the peer network element BTS, and may send a service packet that includes a BTS_CCLI to the peer network element BTS. If the access network element 50 is a source BSC in FIG. 4A and FIG. 4B, the transmitter 52 may send handoff request signaling (A7 Handoff Req) in 3GPP2 IOS A7 interface signaling to carry the BSC_CCLI to a target BSC, so that the target BSC sends call setup request signaling (Abis Setup Req) in the Abis interface signaling to carry the BSC_CCLI to the peer network element, that is, a target BTS; and may send release target signaling (A7 Drop Target) in the 3GPP2 IOS A7 interface signaling to the target BSC, so that the target BSC sends call release request signaling (Abis Release Req) in the Abis interface signaling to the peer network element, that is, the target BTS; and may send a service packet that includes the BSC_CCLI to the target BSC, so that the target BSC forwards the service packet to the peer network element, that is, the target BTS.

The receiver 54 is primarily configured to receive signaling and a service packet. For example, if the access network element 50 is a BSC in FIG. 3A and FIG. 3B, the receiver 54 may receive call setup acknowledgement signaling (Abis Setup Ack) in Abis interface signaling from a peer network element BTS, where the call setup acknowledgement signaling carries a BTS_CCLI, and may receive call release acknowledgement signaling (Abis Release Ack) in the Abis interface signaling from the peer network element BTS, and may receive a service packet that includes a BSC_CCLI and is from the peer network element BTS. If the access network element 50 is a source BSC in FIG. 4A and FIG. 4B, the receiver 54 may receive handoff request acknowledgement signaling (A7 Handoff Req Ack) in 3GPP2 IOS A7 interface signaling from a target BSC, where the handoff request acknowledgement signaling carries the BTS_CCLI and is triggered by call setup acknowledgement signaling (Abis Setup Ack) in the Abis interface signaling from the peer network element, that is, the target BTS, where the call setup acknowledgement signaling carries the BTS_CCLI; and may receive release target acknowledgement signaling (A7 Drop Target Ack) in the 3GPP2 IOS A7 interface signaling from the target BSC, where the release target acknowledgement signaling is triggered by call release acknowledgement signaling (Abis Release Ack) in the Abis interface signaling from the peer network element, that is, the target BTS; and may receive a service packet from the peer network element, that is, the target BTS, where the service packet is forwarded by the target BSC and includes the BSC_CCLI.

The processor 56 is primarily configured to perform functions of controlling and processing signaling and a service packet. For example, if the access network element 50 is the BSC in FIG. 3A and FIG. 3B, the processor 56 may address, according to the BSC_CCLI included in the service packet, a logical resource allocated by the access network element 50 to a call leg, and send the service packet received by the receiver 54 to the logical resource, so that the logical resource processes the service packet; and after the receiver 54 receives the call release acknowledgement signaling (Abis Release Ack) sent by the peer network element BTS, release a service link with the peer network element BTS. If the access network element 50 is the source BSC in FIG. 4A and FIG. 4B, the processor 56 may address, according to the BSC_CCLI included in the service packet, the logical resource allocated by the access network element 50 to the call leg, and send the service packet received by the receiver 54 to the logical resource, so that the logical resource processes the service packet; and after the receiver 54 receives the release target acknowledgement signaling (A7 Drop Target Ack) that is sent by the target BSC as triggered by the call release acknowledgement signaling (Abis Release Ack) sent by the peer network element, that is, the target BTS, release a service link with the target BSC and a service link with the peer network element, that is, the target BTS.

Understandably, the foregoing description merely uses operations, which are performed by the transmitter 52, the receiver 54, and the processor 56 when the access network element 50 functions as a BSC, as an example. However, the present invention is not limited thereto. The access network element 50 may also be a BTS or another access network element; and operations, which are performed by the transmitter 52, the receiver 54, and the processor 56 when the access network element 50 functions as a BTS, are not repeated herein. A person skilled in the art can apparently know such operations by referring to FIG. 3A, FIG. 3B, FIG. 4A, and FIG. 4B. In addition, a person skilled in the art may understand that the transmitter 52 and the receiver 54 may be combined into a transceiver, which should also be covered in the protection scope of the present invention.

The foregoing description is merely exemplary embodiments of the present invention, but is not intended to limit the present invention in any form. Although the present invention has been disclosed above with reference to exemplary embodiments, the exemplary embodiments are not intended to limit the present invention. Any person skilled in the art may derive equivalent embodiments by making modifications or improvements or equivalent changes based on the technical content disclosed above and without departing from the scope of the technical solutions of the present invention. Any simple modifications, equivalent changes, and improvements made to the foregoing embodiments according to the technical essence of the present invention shall still fall within the scope of the technical solutions of the present invention.

What is claimed is:
1. A call processing method, comprising:
  sending, by an access network element, first signaling to a peer network element, wherein the first signaling carries a first call leg identifier that identifies a logical resource allocated by the access network element to a call leg;
  receiving, by the access network element, a service packet sent by the peer network element, wherein the service packet comprises the first call leg identifier;

addressing, by the access network element and according to the first call leg identifier, the logical resource allocated by the access network element to the call leg; and sending the service packet to the logical resource so that the logical resource processes the service packet.

2. The call processing method according to claim 1, further comprising:

receiving, by the access network element, second signaling sent by the peer network element, wherein the second signaling carries a second call leg identifier that identifies a logical resource allocated by the peer network element to the call leg; and sending, by the access network element, a service packet that comprises the second call leg identifier to the peer network element, so that the peer network element addresses, according to the second call leg identifier, the logical resource allocated by the peer network element to the call leg and sends the service packet to the logical resource, so that the logical resource processes the service packet.

3. The call processing method according to claim 2, further comprising:

sending, by the access network element, third signaling to the peer network element to request releasing of a service link between the access network element and the peer network element; and releasing, by the access network element, the service link after receiving fourth signaling sent by the peer network element.

4. The call processing method according to claim 1, wherein the first signaling comprises Abis interface signaling.

5. The call processing method according to claim 1, wherein the access network element is a base station controller in a mobile communications system, and wherein content of the first call leg identifier comprises at least one of a base station controller identifier, a subrack ID, a slot ID, a destination signaling point index, a service packet processing unit control block index, an uplink/downlink flag, a soft handoff leg, and a channel type.

6. The call processing method according to claim 1, wherein the access network element and the peer network element are a base station and a base station controller in a mobile communications system, respectively, and wherein content of the first call leg identifier comprises at least one of a base station controller identifier, a base station identifier, a slot ID, a channel processing unit identifier, a service link index, and an uplink/downlink flag.

7. The call processing method according to claim 1, wherein the sending, by an access network element, first signaling to a peer network element comprises sending fifth signaling that carries the first call leg identifier to a third access network element, so that the third access network element sends sixth signaling that carries the first call leg identifier to the peer network element, wherein the first signaling comprises the fifth signaling and the sixth signaling, and the fifth signaling and the sixth signaling are interface signaling of different types.

8. The call processing method according to claim 7, wherein the fifth signaling is handoff request signaling in 3GPP2 IOS A7 interface signaling, and the sixth signaling is call setup request signaling in Abis interface signaling.

9. An access network element, comprising:

a transmitter, configured to send first signaling that carries a first call leg identifier to a peer network element, wherein the first call leg identifier identifies a logical resource allocated by the access network element to a call leg;

a receiver, configured to receive a service packet sent by the peer network element, wherein the service packet comprises the first call leg identifier; and a processor, configured to address, according to the first call leg identifier, the logical resource allocated by the access network element to the call leg, and send the service packet to the logical resource, so that the logical resource processes the service packet.

10. The access network element according to claim 9, wherein the receiver is further configured to receive second signaling that is sent by the peer network element and carries a second call leg identifier, wherein the second call leg identifier identifies a logical resource allocated by the peer network element to the call leg; and wherein the transmitter is further configured to send a service packet that comprises the second call leg identifier to the peer network element, so that the peer network element addresses, according to the second call leg identifier, the logical resource allocated by the peer network element to the call leg and sends the service packet to the logical resource, so that the logical resource processes the service packet.

11. The access network element according to claim 10, wherein the transmitter is further configured to send third signaling to the peer network element to request releasing of a service link between the access network element and the peer network element;

wherein the receiver is further configured to receive fourth signaling sent by the peer network element; and wherein the processor is further configured to release the service link after the receiver receives the fourth signaling sent by the peer network element.

12. The access network element according to claim 9, wherein the first signaling comprises Abis interface signaling.

13. The access network element according to claim 9, wherein the access network element is a base station controller in a mobile communications system, and wherein content of the first call leg identifier comprises at least one of a base station controller identifier, a subrack ID, a slot ID, a destination signaling point index, a service packet processing unit control block index, an uplink/downlink flag, a soft handoff leg, and a channel type.

14. The access network element according to claim 9, wherein the access network element and the peer network element are a base station and a base station controller in a mobile communications system, respectively, and wherein content of the first call leg identifier comprises at least one of a base station controller identifier, a base station identifier, a slot ID, a channel processing unit identifier, a service link index, and an uplink/downlink flag.

15. The access network element according to claim 9, wherein the access network element is a network element device in one of a code division multiple access system, a global system for mobile communications, a universal mobile telecommunications system, a transport network, and a fixed network.

16. The access network element according to claim 9, wherein the transmitter is further configured to send fifth signaling that carries the first call leg identifier to a third access network element, so that the third access network element sends sixth signaling that carries the first call leg identifier to the peer network element, wherein the first signaling comprises the fifth signaling and the sixth signaling, and wherein the fifth signaling and the sixth signaling are interface signaling of different types.

17. The access network element according to claim 16, wherein the fifth signaling is handoff request signaling in 3GPP2 IOS A7 interface signaling, and wherein the sixth signaling is call setup request signaling in Abis interface signaling.

18. The access network element according to claim 16, wherein the fifth signaling is call setup acknowledgement signaling in Abis interface signaling, and the sixth signaling is handoff request acknowledgement signaling in 3GPP2 IOS A7 interface signaling.

19. The access network element according to claim 11, wherein the transmitter is further configured to send seventh signaling to a third access network element, so that the third access network element sends eighth signaling to the peer network element, wherein the third signaling comprises the seventh signaling and the eighth signaling, and the seventh signaling and the eighth signaling are interface signaling of different types.

20. The access network element according to claim 19, wherein the seventh signaling is release target signaling in 3GPP2 IOS A7 interface signaling, and wherein the eighth signaling is call release request signaling in Abis interface signaling.

* * * * *